United States Patent Office 3,243,354
Patented Mar. 29, 1966

3,243,354
METHOD FOR THE PRODUCTION OF 5'-NUCLEOTIDES
Yoshio Nakao, Osaka, Akira Imada, Hyogo, Ikuo Nogami, Osaka, and Seizi Igarasi, Hyogo, Japan, assignors to Takeda Chemical Industries, Ltd., Osaka, Japan
No Drawing. Filed Jan. 30, 1963, Ser. No. 255,120
Claims priority, application Japan, Jan. 31, 1962, 37/3,592
13 Claims. (Cl. 195—28)

This invention relates to a novel and useful method for the production of 5'-nucleotides.

Production of 5'-nucleotides by using microorganisms has hitherto been effected through either of the following two processes: one where ribonucleic acid is desirably hydrolyzed by the action of phosphodiesterase produced by microorganisms, and the other where microorganisms capable of producing 5'-nucleotides during the incubation and of accumulating the same in the medium are incubated under suitable conditions for this purpose. However, these known processes are necessarily accompanied with disadvantages when effected on an industrially large scale. More concretely, in the former process, microorganisms for the source of ribonucleic acid— e.g., yeast—and microorganisms capable of producing the enzyme-system to desirably hydrolyze the ribonucleic acid into 5'-nucleotides must respectively be incubated. In the latter case, while the objective 5'-nucleotides are accumulated during the incubation of microorganisms, the concentration of so-accumlated 5'-nucleotides is necessarily low.

On the other hand, the present inventors have succeeded in obtaining 5'-nucleotides directly from cells of asporogenous yeasts, the nucleotides being produced from the intracellular ribonucleic acid of the asporogenous yeasts by the action of a co-existing enzyme-system. The new proces herein-presented is quite suitable for practical application for the industrial production of 5'-nucleotides for which demand is markedly increasing.

It is, therefore, the main object of this invention to provide a new and useful method for the production of 5'-nucleotides, especially suitable for production on an industrially large scale.

Another object of this invention is the essential elimination of troubles and disadvantages necessarily involved in carrying out the hitherto-known processes for the production of 5'-nucleotides.

The method of the present invention is, broadly stated, effected by keeping grown asporogenous yeasts suspended in an aqueous acid solution. For example, suitable asporogenous yeasts are suspended in a buffer solution or in a salt solution of 0.1 to 0.5 mole per liter concentration for about one to about ten hours, keeping the suspension at an acid pH of around 3.0 to 6.0, desirably 4.5 to 5.5, for at least 10 to 30 minutes in the initial stage of the suspension period, when the suspension may be allowed to stand still or may be agitated and/or aerated. It is stressed that more than 90 percent of intracellular ribonucleic acid of the asporogenous yeasts is excreted from the cells as 5'-nucleotides simply by subjecting the asporogenous yeasts to the treatment outlined above.

It has been newly found by the present inventors that almost all intracellular ribonucleic acid can be degraded into 5'-nucleotides when the asporogenous yeasts are kept in an acid medium suspended under suitable conditions and that the so-produced 5'-nucleotides come out of cells into the medium. The present invention has been accomplished on the basis of said findings and investigations further made by the present inventors.

The asporogenous yeasts to be used for the purpose of the present invention may, for example, be selected from those of such genera as Brettanomyces, Candida, Cryptococcus, Kloeckera, Mycoderma, Rhodotorula and Torulopsis; more specifically, the following microorganisms are the most useful species among these genera, but they are only a part of examples capable of being used for the method of the present invention, and no limitation of the scope of the invention to the following species nor even to the above-mentioned genera is intended:

*Brettanomyces claussenii* Custers,
*Brettanomyces bruxellensis* Kufferath et van Laer,
*Candida pseudotropicalis* (Cast.) Basgal,
*Candida tropicalis* (Cast.) Berkhout,
*Candida utilis* (Henneberg) Lodder et van Rij,
*Cryptococcus laurentii* (Kufferath) Skinner,
*Cryptococcus neoformans* (Sanfelice) Buillemin,
*Kloeckera apiculata* (Reess emend. Klöcker) Janke,
*Kloeckera africana* (Klöcker) Janke,
*Mycoderma tannica* Asai,
*Rhodotorula mucilaginosa* (Jörg.) Harrison,
*Rhodotorula pallida* Lodder,
*Torulopsis candida* (Saito) Lodder,
*Torulopsis famata* (Harrison) Lodder et van Rij.

The cultivation of the microorganisms is carried out in an aqueous culture medium. It is usually required that the culture medium contains such nutrients for the microorganisms as assimilable carbon sources, digestible nitrogen sources, and preferably, inorganic substances, vitamins, other growth promoting factors, etc. These nutrients may of course be obtained from natural sources or may be synthetic. The carbon sources may be, for example, glucose, lactose, maltose, glycerol, starch, dextrin, etc.; as the nitrogen sources, for example, ammonium salts, nitrates, urea, etc.; as carbon and nitrogen sources, for example, peptone, meat extracts, yeast extracts, soybean flour, cornsteep liquor, molasses, casein, casein hydrolyzates, gluten, rice bran, a variety of amino acids, etc.; and as the inorganic nutrients, for example, potassium phosphate, sodium chloride, magnesium sulfate, ferric chloride, sodium nitrate, calcium chloride, etc.

The incubation is usually carried out for about 10 to about 72 hours at a temperature of about 25 to 30° C., but the optimum period of the incubation varies with such factors as the kind of asporogenous yeasts, the composition of media, the temperature, whether the medium is agitated or not, etc. The asporogenous yeasts thus cultivated contain ribonuleic acid in a quantity of about 4 to 10 percent relative to their dried cell weight.

In the next stage, the resulting crude cells of the asporogenous yeasts are kept in an aqueous medium adjusted at a pH of about 3.0 to about 6.0, desirably 4.5 to 5.5. For this purpose, the asporogenous yeasts may or may not be separated from the culture medium. When they are separated from the culture medium, they are then suspended in an aqueous medium. As the aqueous medium, an acidic buffer solution may preferably be employed. For example, acetic acid buffer solution or succinic acid buffer solution of desired pH may be conveniently used. If necessary, organic or inorganic salts may further be added so as to make the final concentration of salt about 0.1 to 0.5 mole per liter. The salt for the purpose may preferably be sodium chloride, potassium chloride and ammonium chloride, for instance. The suspension is usually allowed to stand or shaken or agitated for 1 to 10 hours at a temperature of about 20 to about 50° C., desirably 30 to 45° C.

When the asporogenous yeasts are subjected to the aqueous medium of the acid pH without being separated from the culture medium, the culture medium should be adjusted to an acid pH of about 3.0 to about 6.0, desirably 4.5 to 5.5 and salt concentration of about 0.1 to about 0.5 mole per liter, for example, by the addition of such solutes or buffer solutions as enumerated in the preceding paragraph or by the dilution with water. Further treatment may be carried out in a similar manner to the above-mentioned suspension process.

A relatively short time is required for the acid treatment of these microorganisms, but an at least 10 to 30 minute treatment is necessary for the purpose. Thus, the aqueous medium in which the microorganisms are maintained is once strictly adjusted to a desired acid pH and kept at the acidic pH within a desired scope for a period longer than the said shortest limit. There is then no need to pay attention to the adjustment of the pH, even if the pH of the suspension would rise to neutral.

It is preferable, prior to or during the suspension process, to subject the asporogenous yeasts to a physical or chemical treatment to somewhat damage the envelopes of the cells or to alter the permeability of the same, whereby the period required for the suspension process can be shortened. For example, the asporogenous yeasts may be frozen once or repeatedly prior to being subjected to the suspension process. It also results in an improvement of the said sole suspension process to allow cells of the asporogenous yeasts to contact with an organic solvent such as ethyl acetate, toluene, acetone, etc., with an antibiotic—especially a polyene-type antibiotic—such as nystatin (refer to J. D. Dutcher et al.: Antibiotics Annual (1953–1954) page 191), eurocidin (refer to K. Nakazawa: Journal of the Agricultural Chemical Society of Japan, vol. 29, p. 650), candimycin (refer to M. Shibata et al.: The Journal of Antibiotics, series B, vol. 7, p. 168 (1954); Japanese Patent No. 301,240), amphotericin B (refer to J. Vandeputte et al.: Antibiotics Annual (1955–1956) p. 587), trichomycin (refer to Hosoya et al.: The Journal of Antibiotics, series B, vol. 5, p. 564 (1952)) etc., with a cationic surface active agent such as cetyl trimethyl ammonium bromide, etc. or with a glucanase produced by a microorganism belonging to the genus Trametes or the genus Streptomyces, e.g., *Trametes sanguinea* (L. ex Fr.) Lloyd, etc. These chemical treatments for somewhat damaging or altering the nature of cell envelopes may be applied prior to or during the suspension process.

According to said treatments, 80 to 100 percent of the intracellular ribonucleic acid disappears and 60 to 90 percent of the same is changed into 5'-nucleotides such as 5'-adenylic acid, 5'-guanylic acid, 5'-cytidylic acid and 5'-uridylic acid which come out of the cells into the surrounding medium and accumulate therein. In the case of a microorganism producing 5'-adenylic acid deaminase, 5'-inosinic acid may be accumulated in place of 5'-adenylic acid.

When the activity of nucleotidases is too strong, the undesirable results of dephosphorylation are avoidable by adding to the medium a nucleotidase-inhibitor such as arsenates of the like.

5'-Nucleotides thus obtained are in general 5'-adenylic acid, 5'-guanylic acid, 5'-uridylic acid, 5'-cytidylic acid, etc. When deaminase is present in the solution, 5'-inosinic acid and/or 5'-xanthylic acid may be obtained, but the production of these deamination products may be inhibited if only the deaminase activity is beforehand inhibited. These 5'-nucleotides may be collected from the reaction mixture by an adsorption method on, e.g., activated carbon or ion-exchange resin, by a precipitation method by means of salts, or by an extraction method by means of solvent. 5'-nucleotides may be collected as a mixture of two or more kinds of 5'-nucleotides or as individual 5'-nucleotides, in accordance with the means employed for collecting the product.

This invention is described further particularly by the following examples. It will be understood, of course, that this invention is not limited to the particular details of these examples since they only set forth presently preferred exemplary embodiments of the invention. In these examples, the percentages with regard to the compositions of media are of weight per volume and the other percentages are on a weight basis. Temperatures are all uncorrected and shown in degrees centigrade.

*Example 1*

*Rhodotorula pallida* Lodder (ATCC–14926) is incubated at 28° for 30 hours in 30 liters of an aqueous medium (pH 6.2) composed of 5.0% of glucose, 0.5% of peptone, 0.5% of meat extract, 0.2% of yeast extract, 0.05% of magnesium sulfate and 0.01% of calcium chloride, in addition to water, and then the cells are collected. The cells are suspended in 5 liters of acetic acid buffer solution (0.25 mole, pH 5.0). After agitating the suspension for 5 hours at 37°, cells are separated from the liquid part. The washings obtained by washing the cells with water are combined with the above-obtained liquid part. The solution is treated by conventional means (adsorption on activated carbon) for the recovery of 5'-nucleotides to obtain 8.2 grams of 5'-adenylic acid, 7.7 grams of 5'-guanylic acid, 5.3 grams of 5'-cytidylic acid and 6.7 grams of 5'-uridylic acid.

*Example 2*

*Rhodotorula pallida* Lodder (ATCC–14926) is incubated at 28° for 30 hours in 30 liters of an aqueous medium composed of 3.0% of cornsteep liquor, 0.5% of urea, 0.05% of magnesium sulfate, 0.1% of potassium monohydrogen phosphate and 0.5% of potassium dihydrogen phosphate, in addition to water, and then the pH of the mixture is adjusted to 5.0 by the addition of about 3 liters of 2-molar acetate buffer solution. Further cultivation is carried out for 6 hours, then the cells are separated. The filtrate is treated in the same manner as in Example 1 to obtain 7.5 grams of 5'-adenylic acid, 6.9 grams of 5'-guanylic acid, 5.1 grams of 5'-cytidylic acid and 6.1 grams of 5'-uridylic acid.

*Example 3*

*Mycoderma tannica* Asai (ATCC–14927) is incubated at 28° for 30 hours in 30 liters of the same medium as employed in Example 1, then the cells are collected. The cells are suspended in 10 liters of acetic acid buffer solution (0.25 mole, pH 4.0). After agitating the suspension for 4 hours at 37°, cells are separated from the liquid part. The liquid part is treated as in the preceding examples to obtain 3.2 grams of 5'-adenylic acid, 2.6 grams of 5'-guanylic acid, 2.1 grams of cytidylic acid and 3.1 grams of 5'-uridylic acid.

Having thus disclosed the invention, what is claimed is:

1. A method for the production of 5'-nucleotides which comprises suspending cultured asporogenous yeast in an aqueous medium which is substantially devoid of ribonucleic acid and containing a concentration of from 0.1 to 0.5 mole of salt per liter, maintaining the pH of the aqueous medium at 3.0 to 6.0 for at least 10 to 30 minutes in the initial stage of the suspension period, maintaining the suspension in the aqueous solution at a temperature of from 20° to 50° C. until the intracellular ribonucleic acid of the asporogenous yeast is degraded into 5'-nucleotides which are accumulated in the medium, and recovering the accumulated 5'-nucleotides from the aqueous medium.

2. The method as claimed in claim 1, wherein the cultured asporogenous yeasts are frozen at least once prior to being subjected to the suspension process.

3. The method as claimed in claim 1, wherein the cultured asporogenous yeasts are brought into contact with an organic solvent selected from the group consisting of ethyl acetate, toluene, and acetone.

4. The method as claimed in claim 1, wherein the cultured asporogenous yeasts are brought into contact with a polyene-type antibiotic selected from the group consisting of nystatin, eurocidin, candimycin, amphotericin B and trichomycin.

5. The method as claimed in claim 1, wherein the cultured asporogenous yeasts are brought into contact with a cationic surface active agent.

6. The method as claimed in claim 1, wherein the cultured asporogenous yeasts are brought into contact with a glucanase from a microorganism.

7. The method as claimed in claim 1, wherein the acid aqueous medium is of a pH of 4.5 to 5.5.

8. The method as claimed in claim 1, wherein the asporogenous yeast is one belonging to the genus Rhodotorula.

9. The method as claimed in claim 1, wherein the asporogenous yeast is one belonging to the genus Mycoderma.

10. The method as claimed in claim 8, wherein the yeast is *Rhodotorula pallida* Lodder.

11. The method as claimed in claim 9, wherein the yeast is *Mycoderma tannica* Asai.

12. A process for the production of 5'-nucleotides which comprises supending cultured *Rhodotorula pallida* Lodder (ATCC–14926) in an acetate buffer solution at a pH of 5, said solution being substantially devoid of ribonucleic acid, agitating the suspension for 5 hours at 37° C., separating the yeast cells from the liquid, and recovering the 5'-nucleotides from the liquid by adsorption on activated carbon.

13. A process for the production of 5'-nucleotides which comprises suspending cultured *Mycoderma tannica* Asai (ATCC–14927) in an acetate buffer solution at a ph of 4, said solution being substantially devoid of ribonucleic acid, agitating the suspension for 4 hours at 37° C., separating the yeast cells from the liquid, and recovering the 5'-nucleotides from the liquid by adsorption on activated carbon.

References Cited by the Examiner

UNITED STATES PATENTS 3,104,171   9/1963   Sakaguchi et al. _____ 195—28

FOREIGN PATENTS 1,130,785   6/1962   Germany.

OTHER REFERENCES

Cook: The Chemistry and Biology of Yeasts, Academic Press Inc., New York (1958), pages 44 to 57.

A. LOUIS MONACELL, *Primary Examiner.*

A. E. TANENHOLTZ, *Assistant Examiner.*